United States Patent [19]
Kojima

[11] Patent Number: 5,799,992
[45] Date of Patent: Sep. 1, 1998

[54] PROTECTIVE DEVICE FOR VEHICLES

[76] Inventor: Kimberly Kojima, 2167 Green River Rd., Williamstown, Mass. 01267

[21] Appl. No.: 751,855

[22] Filed: Nov. 18, 1996

[51] Int. Cl.$^6$ .......................................... B60R 19/42
[52] U.S. Cl. ................... 293/128; 280/770; 293/DIG. 6
[58] Field of Search ........................ 293/128, 41, 102, 293/126, 121, DIG. 6; 248/261, 146.1, 339, 345.1; 160/333, 340, 349.1, 350, 370.4, 370.22; 280/770; 296/128, 41, 102, 126, 127, DIG. 6, 146.1, 152

[56] References Cited

U.S. PATENT DOCUMENTS

| | | | |
|---|---|---|---|
| 4,014,583 | 3/1977 | Forbes | 293/62 |
| 4,750,767 | 6/1988 | Barnett | 293/128 |
| 5,129,695 | 7/1992 | Norman, II | 293/128 |
| 5,156,425 | 10/1992 | Wagner | 293/128 |

Primary Examiner—Gary Hoge
Assistant Examiner—Jason Morrow

[57] ABSTRACT

A device for protecting the outer side surface of a vehicle comprising a protective sheet attached to a rod with the rod being attached to hangers disposed on the windows of the vehicle, wherein the rod is foldable so as to make for compactness and be easily stored when the sheet is then rolled around the folded rod. When the protective sheet is next to the car door, for example, when parked, any externally applied force, such as exerted by a neighboring parked car, will be absorbed by the device. The hanger comprises a hooked end connected to an elongated base which can be readily retracted into a horizontal or parallel position with the hook end being fitted over a window of the vehicle to the rod in a stored position, and into a vertical or perpendicular position in the operated position, so that compactness is enhanced and simplicity is maintained.

9 Claims, 3 Drawing Sheets

PROTECTIVE DEVICE FOR VEHICLES

BACKGROUND OF THE INVENTION

1. Field of Invention

This invention relates to protective devices for vehicles; and more particularly, to such devices for protecting the side surface of vehicles from externally applied forces.

2. Background of the Invention

One particularly annoying problem involves parking a vehicle and then having another vehicle parked near by hit the vehicle side when its door is opened, causing knicks, dents and/or scratches thereto. Such damage to the side surface is usually difficult or nearly impossible to fix without a complete resurfacing and painting of the entire door panel, which involves great expense.

Currently, there is nothing on the market which can protect the vehicle side surface from such damage and which is inexpensive to purchase and maintain.

SUMMARY OF THE INVENTION

Accordingly, an object of the invention is to overcome the aforementioned and other disadvantages and deficiencies of the prior art.

The foregoing and other objects are attained by the invention which encompasses a protective device comprising a foldable rod, a pair of retractable hangers attached to the rod for hanging the rod from one or more windows of a vehicle and a rubberized fabric, soft fabric back plastic, or other suitable sheet rollable about the rod in a stored position and hanging from the rod in an operated position so as to provide a protective layer outside the surface of the vehicle.

In the operated position, the hangers are disposed to be perpendicular to the axis of the rod and the "U" shaped ends thereof fit about the edges of the window. In the stored position, the hangers are retracted to a horizontal position so that the sheet can be rolled about the rod. Also, in the stored position, the rod is folded to one half its length so that the device can be conveniently stored for example under the seat when not in use.

DETAILED DESCRIPTION OF THE PREFERRED EMBODIMENTS

Figure 1:
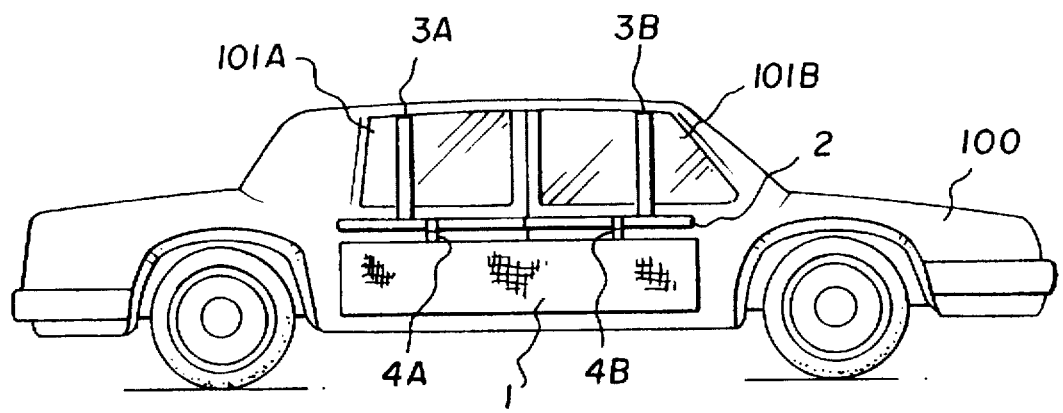
FIG. 1 is a pictorial view depicting an illustrative embodiment of the invention as installed on the side of the vehicle.

FIG. 1 shows the protective device used to protect the side surface of a vehicle 100, such as an automobile, and comprising a rod 2, comprising two sections 2A and 2B, and on which is hung with straps 4A, 4B, a sheet 1, and hangers 3A, 3B which are disposed on top of windows 101A, 101B so that sheet 1 will protect the side surfaces of the car from being damaged by an externally applied force, such as occurs when a car parked next to the concerned car has its door opened and hits the side of the concerned car.

The sheet 1 may be made of rubberized fabric, a relatively thick plastic with or without a terry cloth type backing, heavy canvas or denim, or the like. The thickness and material should be such that an externally applied force will be substantially absorbed by the sheet and also prevent knicks, cuts, dents, etc resulting from the externally applied force.

The device is designed to be readily stored, for example under the seat of the car, when not in use, and then readily brought out, unrolled, hung on the windows 101A, 101B, with the sheet 1 unrolled to hang next to and to protect the car side surface.

Figure 3:
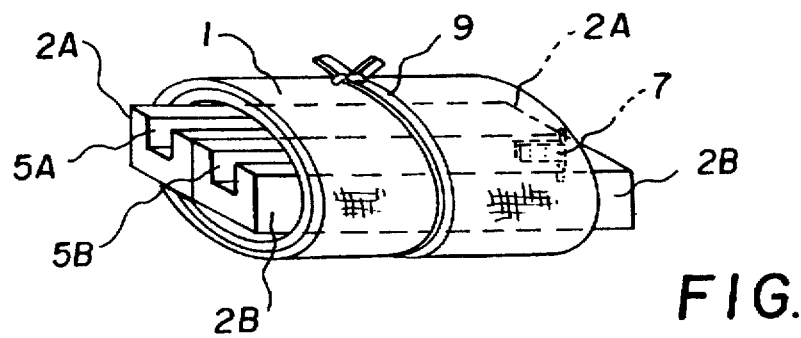
FIG. 3 is a perspective view of the embodiment in a stored position.
Figure 4:
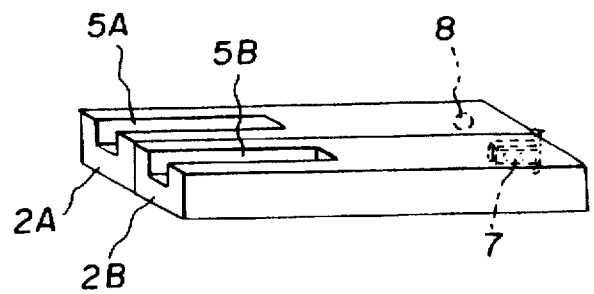
FIG. 4 is a perspective view depicting a folded state of the rod of the embodiment.

Hence, the rod is provided in two sections 2A, 2B, and hinged by hinge 7 so that in the stored position, the two sections 2A and 2B can be folded next to each other about hinge 7. The two sections 2A, 2B are locked together to form the extended rod 2 for the operated condition with the spring button 8 (see FIG.2). The folded over position for section 2A and 2B, are shown in FIGS.3, 4. After the two sections 2A, 2B are folded over each other, the sheet 1, which is also folded in two sections onto each other, is then rolled around the folded sections 2A, 2B, as shown in 3, with a strap 9 used to secure the sheet 1 in the rolled up state. Accordingly, the device can be compactly folded, wrapped, and tied, and stored readily.

Advantageously, the loops 4A,4B which are used to attach sheet 1 to rod sections 2A, 2B (see FIGS. 1,2), are attached to sheet 1 by bonding, adhesive, sewing,etc. The holes of such loops 4A, 4B are of suitable dimensions so as to fit over the rod sections 2A,2B.

Figure 8:
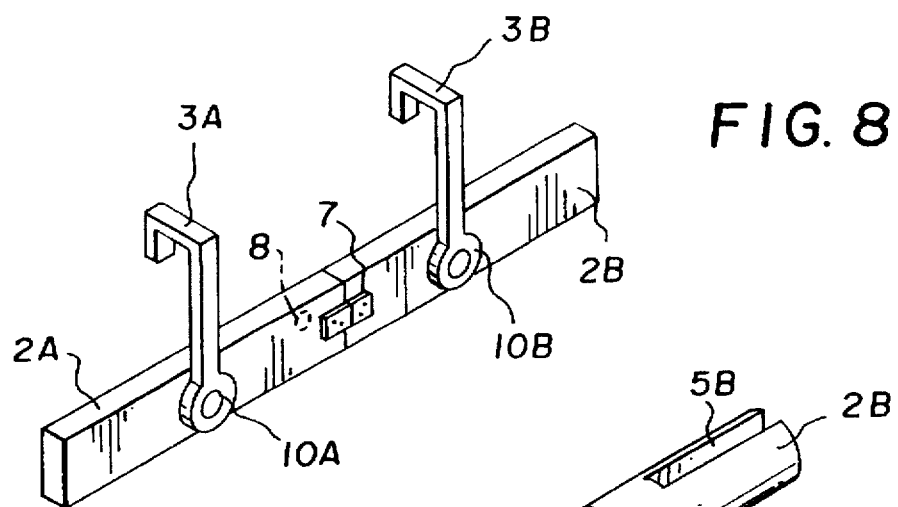
FIG. 8 is a perspective view depicting another hanger arrangement of the invention.
Figure 9:
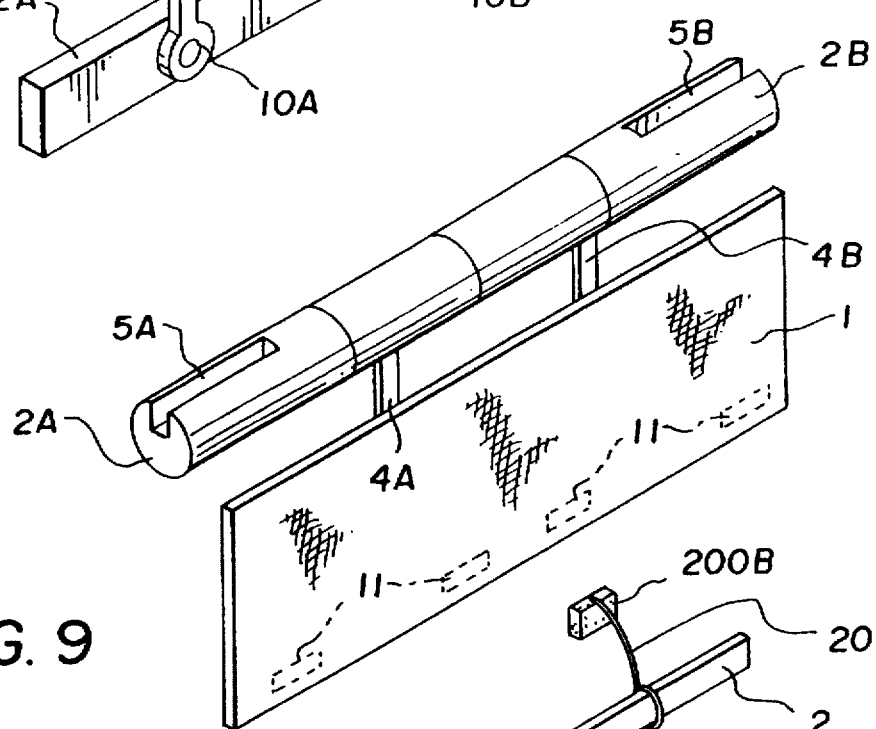
FIG. 9 is a view depicting a circular rod of the embodiment.

A rectangular cross section is shown for rod 2; however, such rod can be of any suitable shape, such as flat, multi-angled, circular,etc. For example, a flat rectangular cross section of the rod 2 is shown in FIG. 8, with the hangers 3A,3B being attached rotatably to a side surface thereof. Also, the rod can be circular, as shown in FIG. 9.

Figure 2:
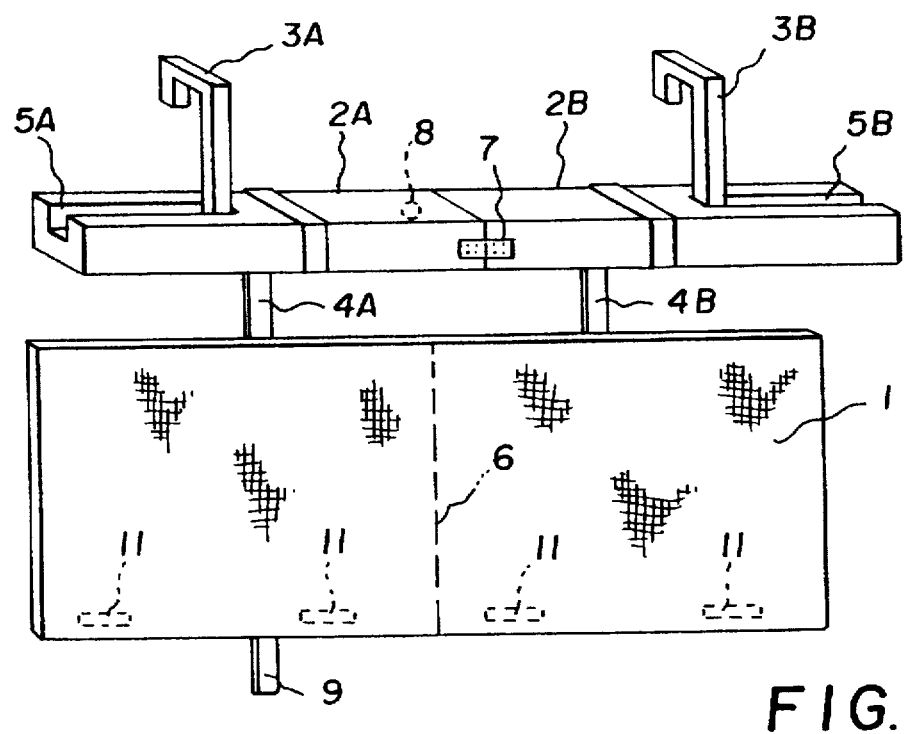
FIG. 2 is a perspective view of the embodiment in an operated position.

An important feature of the invention is the attaching hangers 3A, 3B, which are "L" shaped, with the ends thereof having a "U" shape so that the "U" shaped ends can readily and easily fit over the edge of the windows 101A, 101B, as shown in FIGS. 1 and 2. After placement of the hangers over the windows 101A, 101B, the windows may be positioned as desired,such as fully or partly closed.

Figure 5:
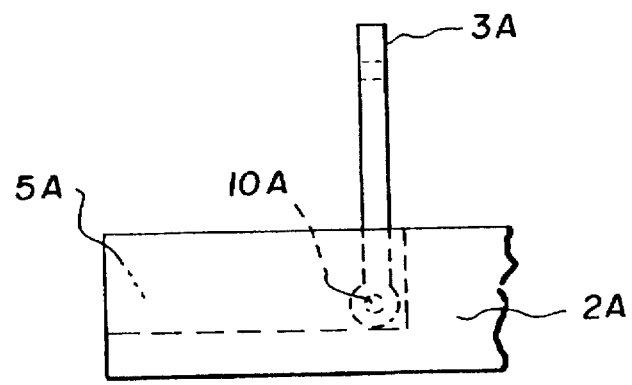
FIG. 5 is a side view depicting the operated position of the hanger of the invention.
Figure 6:
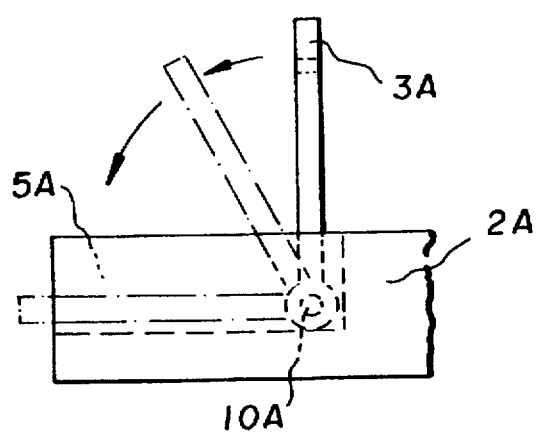
FIG. 6 is a side view depicting the hanger of FIG. 5 being moved from the operated position to a stored position.
Figure 7:
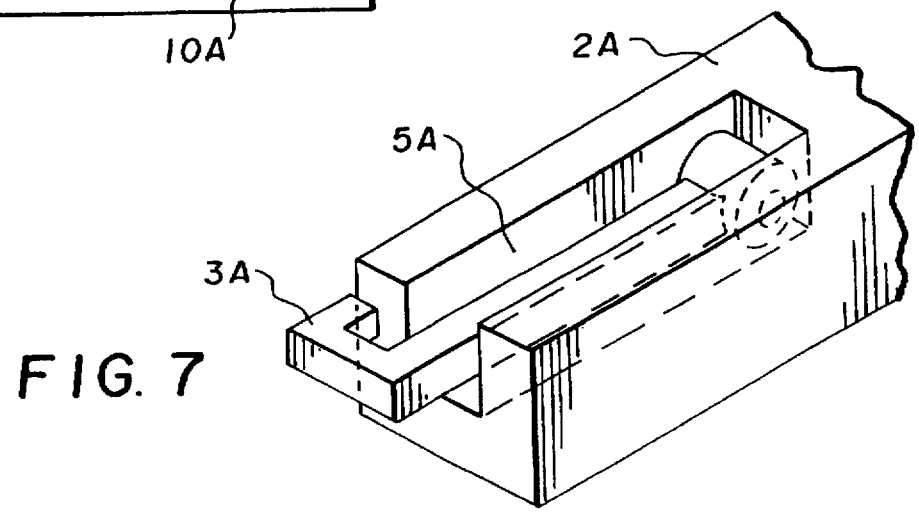
FIG. 7 is a partial side and perspective view depicting the hanger of FIG. 5 is the stored position.

As shown in FIGS. 5, 6, 7, the "L" shaped hangers 3A, 3B are connected rotatably with a bolt 10A, or the like, with detent frictional holder mechanism to hold the hanger, e.g. 3A, in the operated position (see FIG. 5). When it is desired to store the device, the hanger 3A is manually rotated from the vertical position (of FIG. 5, which is the "cooperated position"), downward (see arrow in FIG. 4 to the horizontal position (of FIGS. 6, 7), whereat the "U" end portion of hanger 3A is fit about the side of the rod 2A, and the "L" part is horizontal with the leg thereof fit within the rod 2A. Accordingly, the surface of the rod is without the protrusion of hanger 3A, and the sheet can be rolled therearound without touching the hanger 3A, as shown in FIG. 3.

Thus, in the "operated position", the hangers 3A and 3B are semi-permanently held in the vertical position, i.e. perpendicular to the axis of the rod 2, with use of a detent mechanism, and the two rod sections 2A and 2B are connected semi-permanently to each other and held in an elongated position with use of the spring button arrangement 8. In the operated position, the hangers 3A,3B are positioned above and held by windows 101A, 101B, and the sheet 1 is unrolled to protect the side of the car 100.

On the other hand, in the "stored position", the hangers 3A and 3B are rotated about their holding bolts 10A, 10B from the vertical position to a horizontal position, with the legs being inside the rod or parallel to the lengthwise axis of the rod and the "U" end portions of the hangers 3A, 3B are close to the end surfaces of the rod sections 3a, 3B. Then, the two rod sections 2A and 2B, are moved from the elongated position by operating the spring button 8, and rotating section 2B about hinge 7 to fit next to section 2A. Then, the sheet, which itself was also folded over one section thereof over another section thereof, is rolled around the two folded sections 2A, 2B, and then strap 9 is used to tie the rolled up sheet.

Advantageously, rod 2 may be solid with slots 5A, 5B (see FIGS. 2, 4 and 5–7) located at the ends of the rod, to enable hangers 3A, 3B to be in the vertical (i.e. perpendicular to the axis of the rod) position, during an operated position, or in the horizontal (i.e. parallel to the axis of the rod) position, during the stored position. But, there are other shapes and types of construction which can be used. For example, the ends of the rod may be solid, with the slots 5A, 5B contained therein, and such ends attached to a hollow type. Another alternative is shown in FIG. 8, which shows a rectangular but slightly flat rod 2, wherein the hangers 3A,3B are rotatably bolted to the flat side surface, instead of being within the rod as in the FIG. 1 embodiment. In the FIG. 8 embodiment, the arrangement is simpler than in FIG. 1 since no slot is required, and the detent mechanism can be a slightly raised button on the surface of the rod 2. A further alternative is shown in FIG. 9, wherein a circular rod 2 is used.

Figure 10:
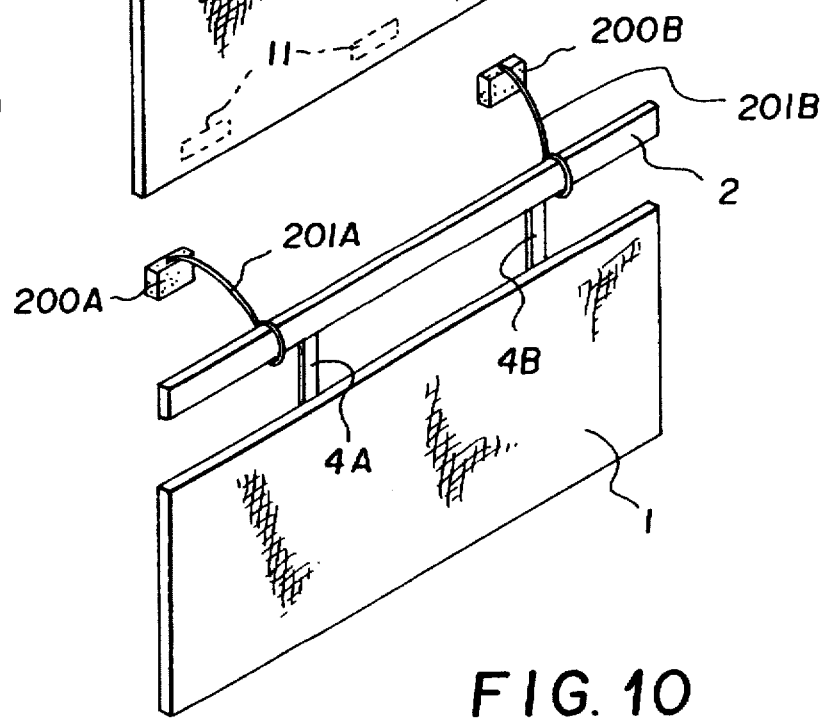
FIG. 10 is a perspective view depicting another hanger arrangement of the invention.

Rod 2 and hangers 3A, 3B can be made of any suitable material, such as metal or plastic, etc. In a further refinement, rod 2 is made of a metal, and magnets 200A and 200B are used to hold the sheet 1. FIG. 10 shows such an embodiment.

In FIG. 10, sheet 1 is held by rod 2, which is made of magnetic material, such as metal, and rod 2 is connected to magnets 200A, 200B by straps 201A, 201B. In the operated state, the magnets are disposed on the inside of windows 101A, 101B (in FIG. 1,e.g.) and held by straps 201a, 201B, so as to hold the metal rod 2 with sufficient magnetic force being supplied through the windows 101A,101B. The straps 201A, 201B are disposed above the window edge and keep the distance between the magnets 200A, 200B and the rod 2 substantially the same, and act to hold the rod and sheet in combination with the magnetic force applied by the magnet to the rod. As shown in FIG. 1, the rod and sheet are place outside of the window, and the magnet is placed inside the window.

In the various embodiments, the bottom of the sheet 1, such as shown in FIGS. 2, 9, 10, there may be provide a weight 11, such as a rod or weighted flat piece so that the weight thereof would hold down the sheet against the vehicle side surface and thus prevent wind or the like from separating the side surface and sheet. In another embodiment, the weights 11, are made of a magnet so that the magnet will be attacted to the metal surface of the side of the vehicle, and thus hold the sheet 1 against the side surface.

Advantageously, the device can be inexpensively manufactured so that the customer can now protect the sides of his car in an easy and readily operable manner without spending an inordinate amount of money. Also, the invention will prevent large resurfacing bills from occurring.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A device for protecting the side surface of a vehicle comprising:

an elongated rod comprising two sections, a spring operated locking means for holding the two sections as an elongated rod, and a hinge means for holding the two sections to be foldable about each other in a stored position;

a pair of hanger means each comprising a hook end connected to an elongated base, each said elongated base being attached to each of said two sections of said elongated rod and being movable to be in a vertical position during an operated position with said hook end fitted over a window of said vehicle, and being movable to be in a horizontal position in said stored position with said hook end fitted adjacent said elongated rod; and a sheet disposed to hang from said two sections of said rod in said operated position so as to protect said side surface of said vehicle and to be rolled about said two sections of said rod in their folded state in said stored position.

2. The device of claim 1, wherein said rod is rectangular in cross section.

3. The device of claim 1, wherein said rod is circular in cross section.

4. The device of claim 1, wherein said sheet is made of rubberized fabric, plastic resin, cloth covered material, canvas, or denim.

5. A device for protecting the side surface of a vehicle comprising:

an elongated rod comprising two sections, a spring operated locking means for holding the two sections as an elongated rod, and a hinge means for holding the two sections to be foldable about each other in a stored position;

a pair of hanger means attached to said two sections of said elongated rod, wherein each of said pair of hanger means comprises a magnet and a strap connected to said elongated rod;

wherein said elongated rod is made of a magnetic material; and whereby in an operated position, said magnet is placed on one side of a window of said vehicle, and said elongated rod is placed on the other side of said window, and said magnet has sufficient magnetic force to hold said elongated rod; and a sheet disposed to hang from said two sections of said elongated rod in said operated position so as to protect said side surface of said vehicle and to be rolled about said two sections of said elongated rod in their folded state in said stored position.

6. The device of claim 2, wherein said rod is solid and has defined therein a slot at each end thereof, and wherein said pair of hanger means are disposed rotatably within each said slot and comprises detent locking means for holding each said elongated base of said hanger means in said vertical position during said operated position, and further each said elongated base of each of said pair of hanger means is rotatable to said horizontal position during said stored position.

7. The device of claim 6, wherein each said hanger means comprises a leg and a "U" end portion, with said "U" end portion being fitted over a window of said vehicle during the operated position.

8. The device of claim 2, wherein said rod is solid and said rectangular cross section has a substantially longer width than thickness so that said rod is generally flat, and wherein each said hanger means comprise a leg and "U" shaped end, with said leg being rotatably attached to a side of said rod.

9. The device of claim 2, wherein said sheet has a weight on a bottom thereof so that in the operated position said sheet will be held against said side surface of said vehicle.

* * * * *